United States Patent
Krauss

(10) Patent No.: US 7,339,121 B2
(45) Date of Patent: Mar. 4, 2008

(54) MULTI WIRE UNION BOX

(76) Inventor: Brian C. Krauss, 1376 W. Woodland Ave., Tiffin, OH (US) 44883

( * ) Notice: Subject to any disclaimer, the term of this patent is extended or adjusted under 35 U.S.C. 154(b) by 241 days.

(21) Appl. No.: 11/304,383

(22) Filed: Dec. 15, 2005

(65) Prior Publication Data

US 2006/0292919 A1 Dec. 28, 2006

(51) Int. Cl.
*H05K 7/02* (2006.01)
(52) U.S. Cl. .......................... 174/541; 174/60
(58) Field of Classification Search ........... 174/60, 174/541, 50, 50.54, 520, 535
See application file for complete search history.

(56) References Cited

U.S. PATENT DOCUMENTS

| | | | | |
|---|---|---|---|---|
| 5,087,795 A | * | 2/1992 | Guginsky | 174/653 |
| 6,259,023 B1 | * | 7/2001 | Reiker | 174/60 |
| 6,713,674 B2 | * | 3/2004 | Chang | 174/50 |
| 6,727,429 B1 | * | 4/2004 | Koessler | 174/50 |
| 7,109,416 B1 | * | 9/2006 | Reed | 174/50 |
| 2005/0269140 A1 | * | 12/2005 | Cox et al. | 177/238 |

* cited by examiner

*Primary Examiner*—Hung V. Ngo

(57) ABSTRACT

The multi wired union box consists of two parts attached together. The first being container with a bottom, top, and sides. Each of the sides has a portal. The second being a metal conducting placed in the shape to allow unbroken contact to each side of the box. The ends of the conductor are bent upward. At the ends of the conductor the upward bent tabs have a flange cut into them which is bent back to form a blade pressure socket when the conductor is placed within the container. The conductor is set in the container. The conductor is placed within the container such that its flange socket lines up with a portal in the sides of the container. The portal in the side of the container and the bent back flange form a wire pressure socket such that when a wire striped of insulation is pushed through the portal in the side of the container it will make positive contact with the bent back flange and the bent back flange will hold the wire securely in place.

20 Claims, 6 Drawing Sheets

MULTI WIRE UNION BOX

FIELD OF INVENTION

This invention relates to wire connectors that are used in home, commercial buildings and more particularly to the electric junction boxes for connecting two or more wires together.

BACKGROUND OF INVENTION

In construction today, electrical wires are usually connected in one of three ways. The first is by using a twist on cap. One usually strips both wires of insulation at the ends, than twists the wires together then screws a cap on over the connection. The second way is by soldering two wires together. Here again one usually strips both wires of insulation at the ends, than twists the wires together and then solders them. The third method is by striping both wires of insulation at the ends, than twisting the wires together and then taping them or placing some type of shrink wrapping over top of them. Once the wires have been connected, then they are usually forced into an electric junction box which is made out of metal or plastic. This system results in many problems. The first being that these methods can result in a poor connection and wires tangled together, as a result of trying to connect the hot, neutral and ground ends together for three or more wires. Thus, the electric does not get to the point where it is wanted. This is especially true if the junction box is in a damp area, or dampness gets into the connection causing the connection to be poor. Secondly, these wires in a poor connection or if the insulation is striped to far can get up against the metal junction box and be grounded causing a short circuit. Short circuits have caused damage ranging from the surges to fires within buildings. Thus, one of the objectives of this invention is to create a union box that allows for the connection of wires perfectly every time. Secondly, the objective is to create a union box that almost completely eliminates the possibility of any type of short occurring by separating and securing wires through the electric junction box and into the multi wire union box.

As pointed out above the three basic methods of attaching wires today is to twist the wires together then either place a cap over them, wrap them with shrink wrap material or tape, or solder them. All three of these ways are time consuming. It would be much easier for the electric contractor to just push the wires into a box. Thus, an objective of this invention is to create a method to attach wires that creates a nearly perfect connection every time that is quick and easy.

Another major problem that occurs is that usually there are several cables of three wires coming into the standard junction box either at the same entry point or through a variety of entry points in the junction box that need to be connected together. These wires must be twisted around each other so the can be connected by the above methods then they are shoved into a junction box which is closed. By shoving them into the junction box one puts strain on connections and may break some of the connections. Also, if the connections or insulation is less than perfect there may be some exposed wire that could short across another wire. This is especially a problem if a wire overheats or moisture collects on the wire. Thus, one of the objectives of this invention is to create a method to attach multiple wires together that is easy, and creates a connection with the cables entering the junction box and then the wires being pushed directly into their appropriate portal with no tangles or intermixing or the hot, neutral and ground.

Electrical push-in technology as it currently exists does not address the standard electrical distribution junction boxes.

The features that allows the inventors device to do this is that he has created a box that allows two or more wires to be connected together easily by just shoving them into the portal of the box. These boxes can be easily attached together so that one can connect two or more cables together with each cable separated and the three or more wires of each cable are pushed into the same area, relevant to the cable entry point in an unconfused or untangled manner.

There have been many attempts in the prior art to solve the problems put forth above. U.S. Pat. No. 4,924,032 to Adkins, U.S. Pat. No. 6,156,971 to May, U.S. Pat. No. 4,165,443 to Filgert, et. al. and U.S. Pat. No. 5,525,754 to Adkins all show electrical boxes for connecting wires.

The biggest problem with all four of these systems is that their boxes contain an assortment of busses that would be difficult and expensive to manufacture.

U.S. Pat. No. 4,165,443 to Filgert shows many boxes that are used to hook up modular switches and receptacle unites. In looking through the drawing one sees that these boxes are very complicated and have a very complicated bus system. The bus itself in Filgert contains at least three different pieces of metal that are bent in different shapes and one has a bus with at least a half dozen pieces. There are also many other components that make up the box. It also looks like in reading through Filgert that there are several different types of boxes that are needed for an electrical system within the house. Applicant's union box is a simple construction that consists of a single bus and it can be adapted to be used with any hook up. Thus applicant's box would be considerable cheaper to manufacture and assemble.

U.S. Pat. No. 6,156,971 to May also show boxes for hooking up an electrical system for a home. Here again the boxes have complicated interior structures for each wire hook up. Also, one would need a different box for different types of hook ups within the home. This would add tremendously to the expense of manufacturing. This system of box would clearly be considerably more expensive to manufacture and assemble than applicant.

U.S. Pat. No. 5,525,754 and U.S. Pat. No. 4,924,032 both to Adkins show a slightly simpler box. In U.S. Pat. No. 5,525,754 Adkins shows a box with three different busses to hook up three different sets of wires and plates of different configuration to hold on these busses. There are also different plates to hold on different other connectors. Although this box is simple it still would be extremely complicated to make and expensive. Adkin's box can, however, be adapted to use for the whole electrical system.

U.S. Pat. No. 4,924,032 shows a box with three internal busses shown in FIG. 3. All these busses would have to be separately stamped and would make this box far more expensive than applicant's device.

SUMMARY OF THE INVENTION

The multi wired electrical union box consists of two parts attached together. The first being container with a bottom, top, and sides. Each of the sides has a portal. The second being a metal conducting placed in the shape to allow unbroken contact to each side of the box. The ends of the conductor are bent upward. At the ends of the conductor the upward bent tabs have a flange cut into them which is bent back to form a blade pressure socket when the conductor is placed within the container. The conductor is set in the container. The conductor is placed within the container such that its flange socket lines up with a portal in the sides of the container. The portal in the side of the container and the bent back flange form a wire pressure socket such that when a wire striped of insulation is pushed through the portal in the side of the container it will make positive contact with the bent back flange and the bent back flange will hold the wire securely in place. In a normal situation when two three wire cables are attached together, three multi wire union junction boxes are used. One box is used for each of the hot, neutral and ground wire. This simple multi wire union junction box can be used by stacking one upon another thus enabling the wires to be attached in an infinite number of ways.

DETAILED DESCRIPTION OF THE PREFERRED EMBODIMENT

Figure 1:
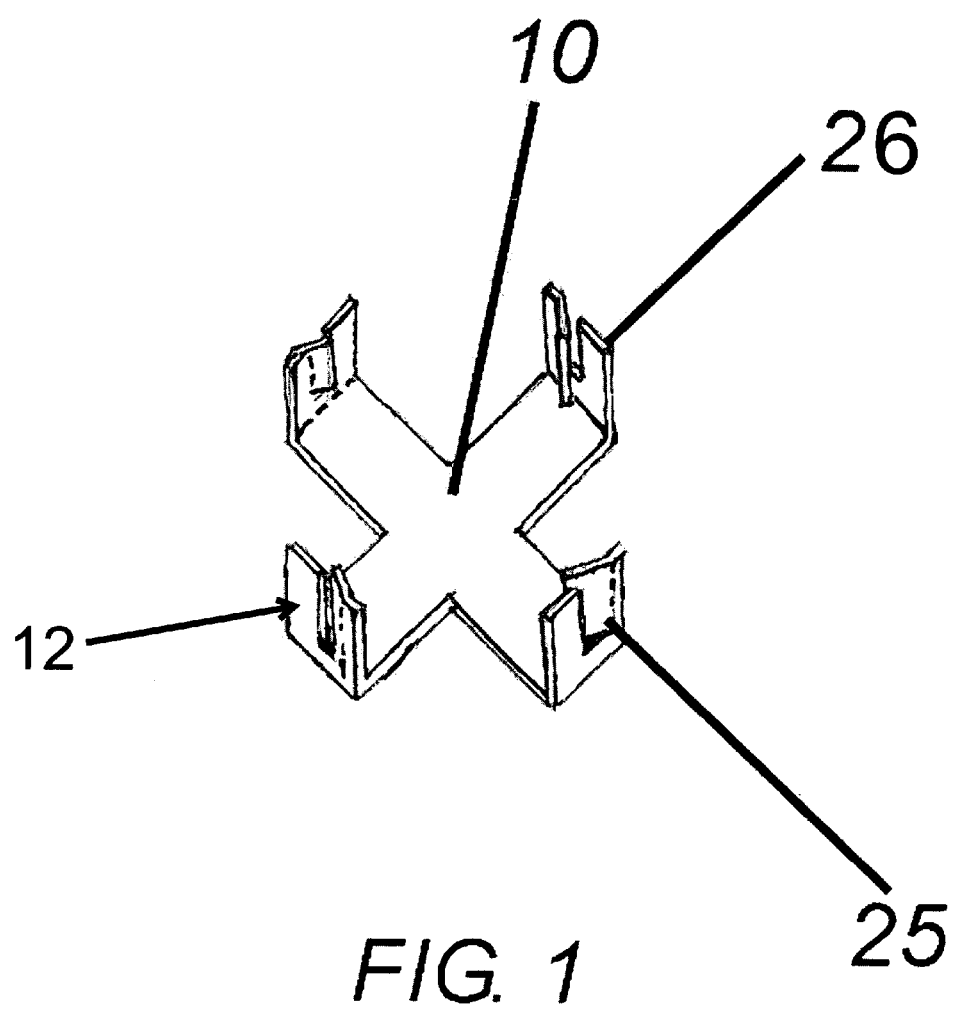
FIG. 1 is a perspective view of the conductor

FIG. 1 shows the conductor 10. The conductor in the preferred embodiment is made out of a highly conductive metal. However, the conductor can be made out of any substance that can conduct well. FIG. 1 shows conductor 10 which is able to connect four wires together. The conductor 10 is shaped to ensure strength and solid circuitry to each portal her illustrated in the shape of a cross. The ends of the legs of the cross are bent upward forming tabs 12. Each of the tabs 12 is cut and bent back to form a bent back flange 25 and a strip 26.

Figure 2:
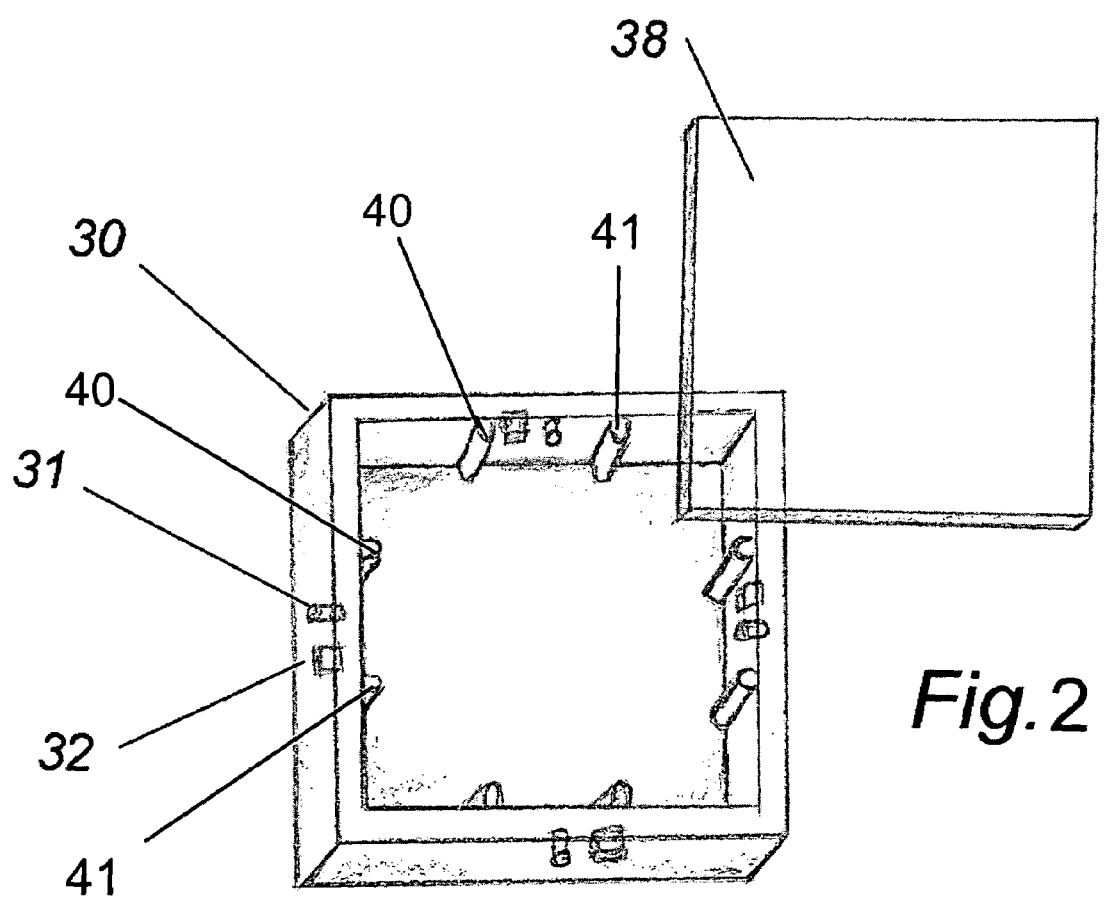
FIG. 2 is a perspective view of the container

FIG. 2 shows the container 14. The container is a box with a bottom and sides and an in this embodiment a top. The container can also be made without a top 38, however, a top 38 for closure ensures that the connections are fully sealed from dirt, moister and that people will not inadvertently coming in contact with the wires or the conductor 10. The closed top is the preferred way. In each side with both with there is placed a portal 31 that is circular. Also placed in each side next to the circular portal 31 is a rectangular release opening 32 to allow a dibble to push against the bent back flange 25. In the preferred embodiment the circular portal 31 is a little bit larger than the diameter of a twelve gauge wire. The circular portal 31 would be designed to be slightly larger than the diameter of the wires to be connected.

Figure 3:
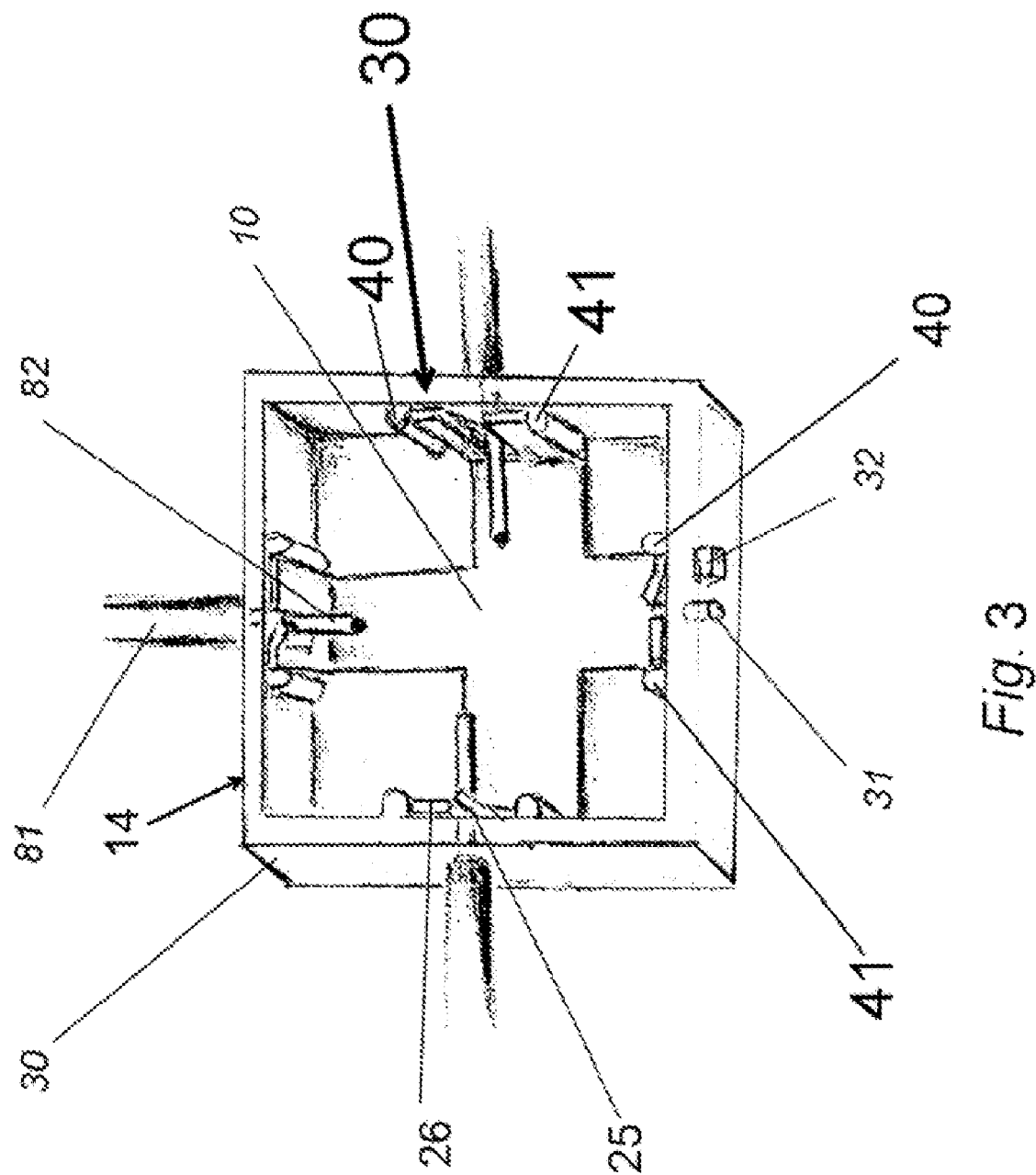
FIG. 3 is a perspective view of the invention.
Figure 5A:
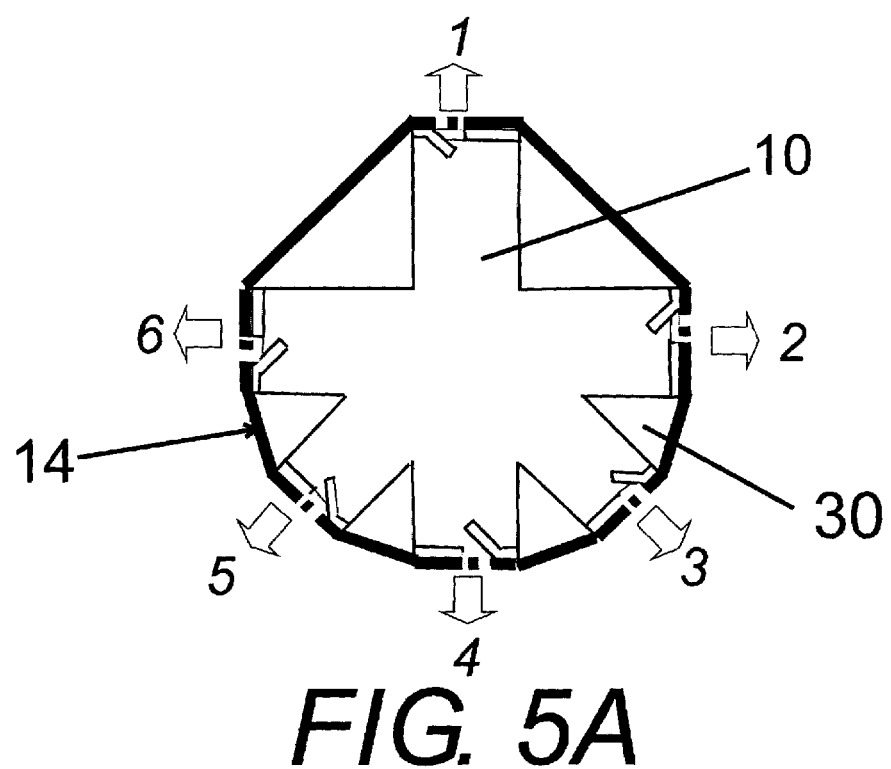
FIG. 5A is another embodiment of the invention.
Figure 5B:
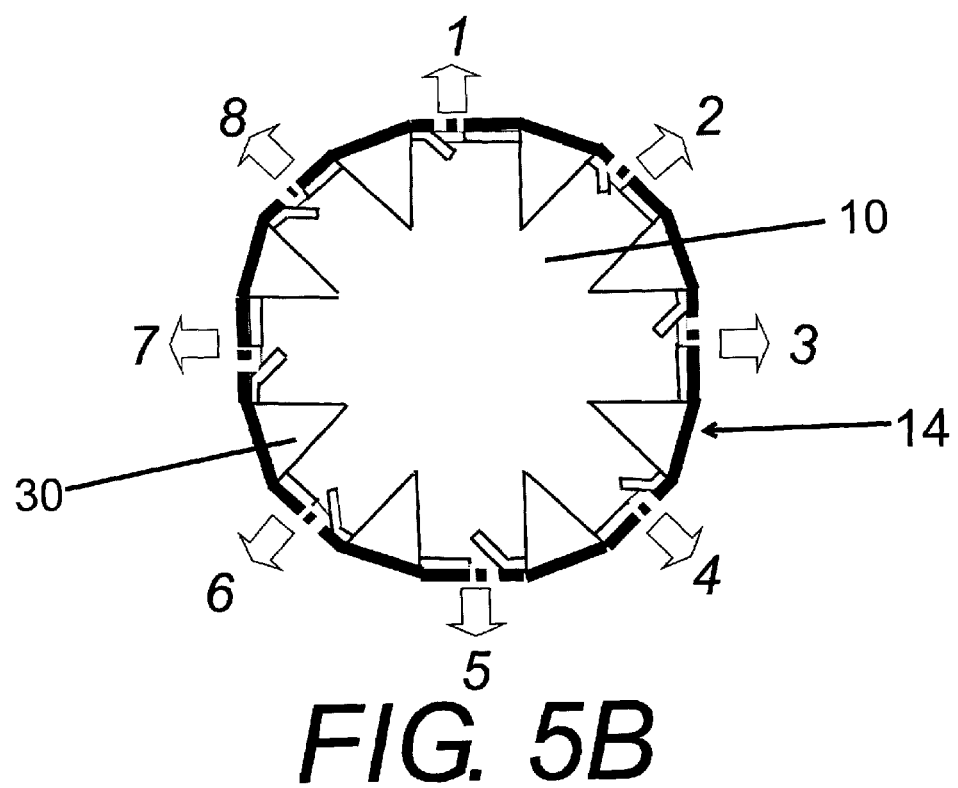
FIG. 5b is another embodiment of the invention.

FIG. 3 shows the conductor 10 of FIG. 1 placed within the container 14 of FIG. 2. There are many was known in the art to attach the conductor 10 to the container 14. The conductor 10 could be attached with glue or laminated in place. In the preferred embodiment there are two post 40 and 41 attached to the sides of the container on each side of the circular portal 31 as shown in FIG. 3. The distance between the two post 40 and 41 is approximately the same as with the end of the conductor 10. Thus when the ends of the conductor 10 is placed between the post 40 and 40 the post 40 and 41 hold the conductor 10 in place by friction. The conductor 10 of FIG. 1 placed within the container 14 of FIG. 2 such that the slight opening formed by the bent back flange 25 and the strip 26 of the conductor 10 lines up with portals 31 in the sides of the container 10. FIG. 3 further shows wires 81 with there insulation stripped forming bare ends 82. The wires 81 with bare ends 82 are placed through portal 31 within the container and are shoved between the bent back flange 25 and the strip 26 of conductor 10. Wires 81 with bare ends 82, having been placed through portal 31, make contact with bent back flange 25 and the strip 26. The bare ends 82 make contact with bent back flange 25 and the strip 26 of conductor 10 which will allow electric to flow from wire 81 into conductor 10. The bent back flange 25 and the strip 26 of conductor 10 will hold the wires configuration can hook up any number of sets of wires. FIG. 5A shows a configuration in which the conductor 10 in the container 14 can hook six different wires together. FIG. 5B shows a configuration in which the conductor 10 in container 14 can hook eight different wires together.

Figure 4:
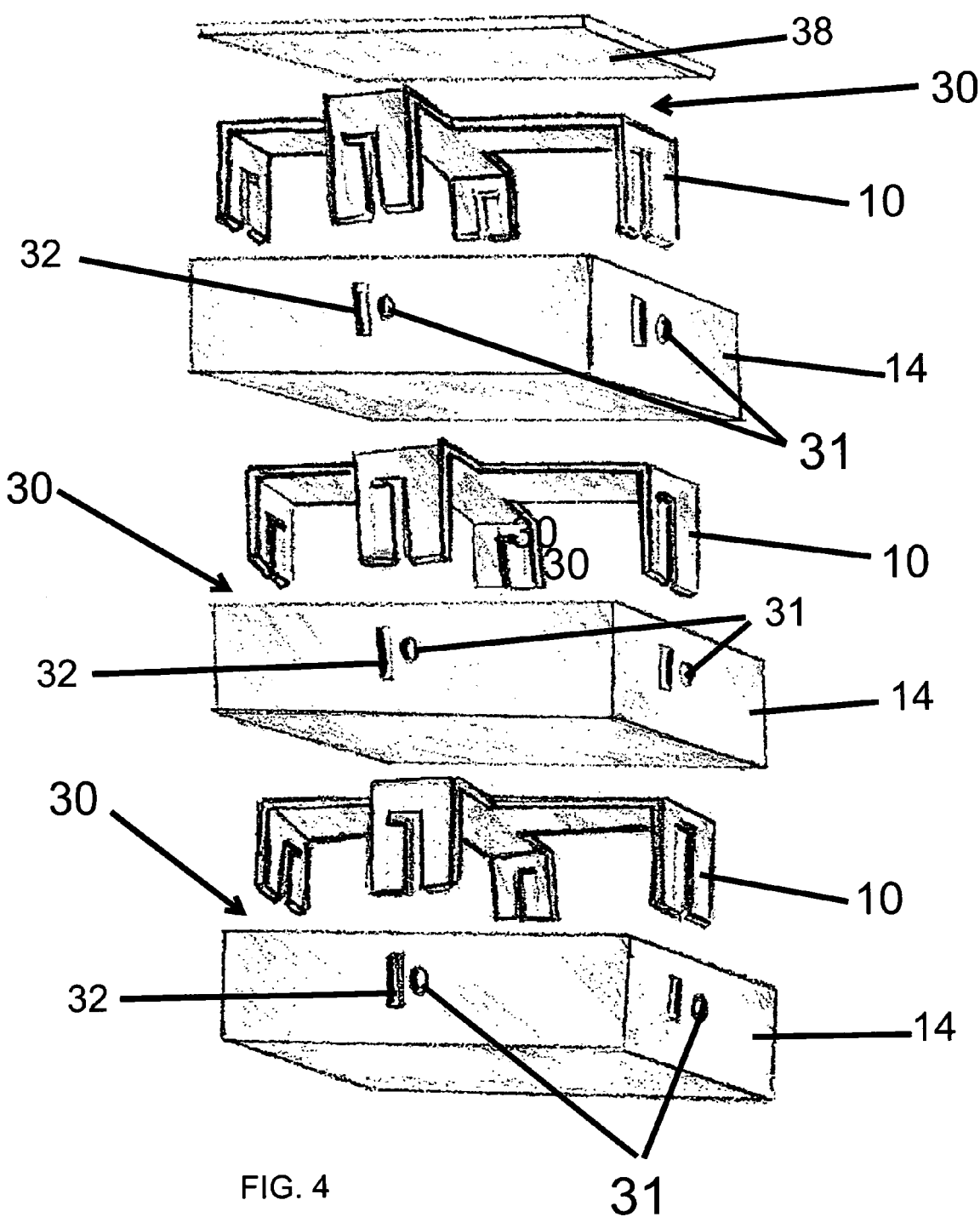
FIG. 4 is an exploded view showing 3 multi wire union boxes as in FIG. 3 attached together.

In a normal situation when a home or building is being wired one usually has to attach a three wire cable to another cable or fixture or appliance which has three wires. In this situation three multi wire union boxes 14 would be attached together as shown in FIG. 4. The boxes could be attached when they are made at the factory or they could be attached at the job site. The boxes could be made at the factory in sets of three. The boxes could also be made individually. If the multi union boxes 14 could also be made in different colors. Three different colored multi wired union boxes could represent the three wires, hot, ground and neutral, usually found in cable. Thus, if the three different colored multi wire union boxes 14 were attached together, they would form a three colored box. In the cable these wires are usually of different colors. The three multi wire union box could be made of the same three colors as the wires. This would enable an electrician to more easily and safely wire a home or office.

In the preferred embodiment three multi wire union boxes 14 of different color would be attached together. An electrician would purchase a multi wire union box 14 at the electrical supplier. To attach two cables in a home, he would attach the box, formed by the three multi wire union boxes together, to a surface. He would than take the insulation off the ends of the three wires in each cable. He would than take the hot wire of one of the cables and push it through a portal 31 in one of the multi wire union boxes 14. He would than take the hot wire of the other cable and push it through one of the other portals 31 of the same multi wire union box 14. He would than perform the same process with the neutral and ground wire of each cable placing them through the portals of the other two multi wire union boxes 14, being sure to push the neutral of both cable though a multi wire union box 14 that did not have the ground or hot wire inserted within it. When inserting the ground wire the electrician was careful to push it through a portal 31 in a multi wire union box 14 that has no hot or neutral wire inserted within it.

Changes and modifications in the specifically described embodiments can be carried out without departing from the scope of the invention which is intended to be limited only by the scope of the appending claims.

I claim:
1. A multi wire union box comprising:
 a. a container a with a bottom and sides and an open top and said container forms an enclosure with an outside; and,
 b. a piece of material that conducts electricity; and,
 c. a means for attaching the piece of material within the container; and,
 d. openings in the sides of the container that are of a diameter that an uninsulated wire can be slid through the opening from the outside of the container;

e. at least two means for attaching uninsulated wires to the piece of material within the container, and said means is formed by the openings in the container working in conjunction with the piece of material within the container such that one of the wires attached will be able to conduct electricity to the another wire or wires attached to the piece of material by the mean for attaching an uninsulated wires.

2. A multi wire union box as in claim 1 wherein;
   a. the means for attaching comprises;
      (1) the piece of material is bent upward at its ends and the piece of material is a strip of conducting material that spans the container; and,
      (2) the piece of material bent upward ends have a flange cut within the bent upward ends and said flange is bent back forming an opening slit; and,
      (3) said piece of material is placed within said container such that the opening slit in the flanges that are bent back are inline with the openings in the container; and,
      (4) wherefore when a uninsulated wire is slid through the opening in the side of the container, the uninsulated wire makes contact with both edges of the opening slit thus making contact with the piece of material and said uninsulated wire make contact with both edges of the slit which holds the uninsulated wire securely in place and ensures electric conductivity between the uninsulated wire and the conducting piece of material.

3. A multi wire union box as in claim 2 further comprising;
   a. cutouts in the side of the of the container next to the openings that are of sufficient size to allow a rod to pass through, and said cutout are aligned with the flange such that when the rod is pushed through the cutout the rod will make contact with the flange; and,
   b. wherefore when individual wishes to remove an uninsulated wire which has been pushed within the opening and is securely held in place, the individual pushes a rod through the cutout next to the opening for the uninsulated wire and makes contact with the flange and push it back allowing the uninsulated wire to be removed from the multi wire union box.

4. A multi wire union box as in claim 2 wherein;
   a. the piece of material is made out of a metal that is a good conductor of electricity.

5. A multi wire union box as in claim 2 wherein;
   a. the container is rectangular prism and has an opening on each of its four sides.

6. A multi wire union box as in claim 5 wherein;
   a. the piece of material is in the shape of a cross with each of its four ends bent upward and the piece of material is a cross of conducting material whose ends that spans the container; and,
   b. the piece of material bent upward ends have a flange cut within the bent upward ends and said flange is bent back forming an opening slit; and,
   c. said piece of material is placed within said container such that the opening slit in the flanges that are bent back are inline with the openings in the four sides of the container; and,
   d. wherefore when a uninsulated wire is slid through the opening in the side of the container, the uninsulated wire makes contact with both edges of the opening slit thus making contact with the piece of material and said uninsulated wire make contact with both edges of the slit which holds the uninsulated wire securely in place and ensures electric conductivity between the uninsulated wire and the conducting piece of material.

7. A multi wire union box comprising:
   a. a first multi wire union box as in claim 3; and,
   b. a second multi wire union box as in claim 3 whose bottom is attached to the top of the first multi wire union box.

8. A multi wire union box comprising:
   a. a first multi wire union box as in claim 3; and,
   b. a second multi wire union box as in claim 3 whose bottom is attached to the top of the first multi wire union box,
   c. a third multi wire union box as in claim 3 whose bottom is attached to the top of the second multi wire union box.

9. A multi wire union box as in claim 8 wherein;
   a. the first, second, and third multi union box are of different colors.

10. A multi wire union box as in claim 9 wherein;
    a. the colors of the multi union boxes are chosen to match the colors of the wires to be attached to them.

11. A multi wire union box as in claim 3 further comprising;
    a. a lid to cover the top of the container.

12. A multi wire union box as in claim 2 wherein;
    a. the container is a polygonal prism with more than four sides; and,
    b. the piece of material has arms that extend outward to the openings in the sides of the container.

13. A multi wire union box as in claim 1 further comprising;
    a. a lid to cover the top of the container.

14. A multi wire union box as in claim 13 wherein;
    a. the lid seals the multi wire union box from dirt, moister, and humans.

15. A multi wire union box as in claim 1 wherein;
    a. the means for attaching the piece of material within the container comprises;
       (1) posts and attached in pairs, one on each side to the openings in the sides of the container, and the distance between the pairs of post is approximately the same as the width of the end of the piece of material; and,
       (2) wherein when the end of the piece of material is placed between the pair of post the piece of material is held in place by friction.

16. A multi wire union box comprising:
    a. a first multi wire union box as in claim 1; and,
    b. a second multi wire union box as in claim 1 whose bottom is attached to the top of the first multi wire union box.

17. A multi wire union box as in claim 16 further comprising;
    a. a third multi wire union box as in claim 1 whose bottom is attached to the top of the second multi wire union box.

18. A multi wire union box as in claim 17 wherein;
    a. the first, second, and third multi union box are of different colors.

19. A multi wire union box as in claim 18 wherein;
    a. the colors of the multi union boxes are chosen to match the colors of the wires to be attached to them.

20. A multi wire union box as in claim 2 further comprising;
    a. a lid to cover the top of the container.

* * * * *